United States Patent
Dong et al.

(10) Patent No.: US 11,372,770 B2
(45) Date of Patent: Jun. 28, 2022

(54) SYSTEM AND METHOD FOR DETERMINING CACHE ACTIVITY AND OPTIMIZING CACHE RECLAMATION

(71) Applicant: Microsoft Technology Licensing, LLC, Redmond, WA (US)

(72) Inventors: Junfeng Dong, Sammamish, WA (US); Ajay Kalhan, Redmond, WA (US); Manoj A. Syamala, Issaquah, WA (US); Vivek R. Narasayya, Redmond, WA (US); Changsong Li, Redmond, WA (US); Shize Xu, Redmond, WA (US); Pankaj Arora, Sammamish, WA (US); John M. Oslake, Seattle, WA (US); Arnd Christian König, Kirkland, WA (US); Jiaqi Liu, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 113 days.

(21) Appl. No.: 17/015,667

(22) Filed: Sep. 9, 2020

(65) Prior Publication Data
US 2022/0075731 A1 Mar. 10, 2022

(51) Int. Cl.
| | | |
|---|---|---|
| *G06F 12/0891* | (2016.01) | |
| *G06F 12/06* | (2006.01) | |
| *G06F 9/30* | (2018.01) | |
| *G06F 9/32* | (2018.01) | |
| *G06F 12/123* | (2016.01) | |
| *G06F 9/48* | (2006.01) | |

(52) U.S. Cl.
CPC ...... *G06F 12/0891* (2013.01); *G06F 9/30047* (2013.01); *G06F 9/321* (2013.01); *G06F 9/4881* (2013.01); *G06F 12/0646* (2013.01); *G06F 12/123* (2013.01)

(58) Field of Classification Search
None
See application file for complete search history.

(56) References Cited

U.S. PATENT DOCUMENTS

| | | | |
|---|---|---|---|
| 10,860,488 B1 * | 12/2020 | Kachmar | G06F 16/172 |
| 2019/0004709 A1 * | 1/2019 | Wang | G06F 3/0607 |
| 2019/0087344 A1 * | 3/2019 | Hijaz | G06F 12/128 |
| 2021/0004329 A1 * | 1/2021 | Yochai | G06F 3/0644 |

* cited by examiner

*Primary Examiner* — William E. Baughman
(74) *Attorney, Agent, or Firm* — Fiala & Weaver P.L.L.C.

(57) ABSTRACT

Methods for determining cache activity and for optimizing cache reclamation are performed by systems and devices. A cache entry access is determined at an access time, and a data object of the cache entry for a current time window is identified that includes a time stamp for a previous access and a counter index. A conditional counter operation is then performed on the counter associated with the index to increment the counter when the time stamp is outside the time window or to maintain the counter when the time stamp is within the time window. A counter index that identifies another counter for a previous time window where the other counter value was incremented for the previous cache entry access causes the other counter to be decremented. A cache configuration command to reclaim, or additionally allocate space to, the cache is generated based on the values of the counters.

20 Claims, 5 Drawing Sheets

SYSTEM AND METHOD FOR DETERMINING CACHE ACTIVITY AND OPTIMIZING CACHE RECLAMATION

BACKGROUND

Traditional practices for determining cache activeness and activeness ratios include iterating through each cache entry in all caches to determine cache hits. The running time for such determinations is proportional to the number of total cache entries and can be expressed using Big-O notation as O(MN), where M is the total number of caches and N is the average number of cache entries per cache. Accordingly, calculating overall cache activeness and activeness ratios is very expensive in overhead as large systems often include many caches and with a large amount of cache entries. As systems such as those with virtual cores that perform system operations become larger and more complex, the resulting overhead in determining cache activeness and activeness ratios correspondingly increases and affects system efficiency and operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for determining cache activity and for optimizing cache reclamation are performed by systems and devices. A cache entry access is determined at an access time, and a data object of the cache entry for a current time window is identified that includes a time stamp for a previous access and a counter index. A conditional counter operation is then performed on the counter associated with the index to increment the counter when the time stamp is outside the time window or to maintain the counter when the time stamp is within the time window. A counter index that identifies another counter for a previous time window where the other counter value was incremented for the previous cache entry access causes the other counter to be decremented. A cache configuration command to reclaim, or additionally allocate space to, the cache is generated based on the values of the counters.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for determining cache activity and for optimizing cache reclamation. Section III below describes example computing device embodiments that may be used to implement features of the embodiments described herein. Section IV below describes additional examples and advantages, and Section V provides some concluding remarks.

II. Example Embodiments for Determining Cache Activity and for Optimizing Cache Reclamation Cloud-based and on-premises implementations for database hosting utilize allocated processing and memory resources to perform their functions. Allocations of such resources may be made as pre-configured options or as pay-as-you-go options for implementation configurations. Both hosts and customers for database hosting can benefit from efficient and robust determinations of cache activeness in order to avoid over- and under-allocations of resources. For instance, in the case of over-allocations of cache memory, a host can reclaim and reallocate underutilized cache portions to other deployments, while a customer can avoid paying for unused resources via support price optimized allocation policies. Memory reclamation for allocated cache may be performed in fixed time windows to evaluate overall cache activeness ratio (i.e., a fraction of pages that were accessed during the time window). If the activeness ratio is below a predefined threshold, the target memory size for the caches is set to a pre-calculated size to shrink or reclaim external and internal caches, including the buffer pool, large cache stores, cache stores, user stores, object stores, etc.

Current solutions for cache allocation include pre-configured allocations for deployments, or configurable cache allocations that are based on cache activeness determinations involving the enumeration through each cache entry of each allocated cache to count active entries. As deployment options for resource allocation provide for larger blocks of memory dedicated to cache, the overhead cost for cache activeness determinations that require enumeration over all entries becomes prohibitively expensive as overall internal caches can become very large. Embodiments herein allow for support of much larger allocations by improving the running time and resources required for calculating overall cache activeness ratios.

Methods for determining internal cache activeness and for cache reclamation are performed by systems and devices according to embodiments herein. The embodiments herein provide solutions to the issues noted above by linking an array of counters for each cache or cache type over a time period, having counters in the array corresponding to time windows of the period, that track unique cache entries that are accessed, as described below. Accordingly, the accesses to entries of a cache, or a group of caches of the same type, can be tracked more efficiently (e.g., fewer processing cycles, fewer memory accesses, less time, etc.) from the counters rather than enumeration over all cache entries, and a cache activeness ratio is determined for any needed reconfiguration of the cache(s) such as expansion or reclamation.

In embodiments, to efficiently calculate internal cache activeness of a given cache or group of caches of the same type, a sliding time period (e.g., 60 minutes in embodiments) implemented as a data structure, such as a circular buffer or circular array, with a fixed number of buckets (i.e., indexed elements) is associated on top of a cache(s). Each bucket represents a fixed time window (e.g., 1 minute in embodiments) with a timestamp. Each bucket tracks the number of cache entries last accessed during the time window using a respective counter. To calculate the total number of unique active entries for a cache or for caches with the same type (e.g., SOS cache stores), embodiments allow for enumeration through the buckets whose time windows are within a designated portion of the time period, e.g., using a "diff" function or the like that specifies the current time and a threshold amount of time before the current time. The counters of the designated buckets are utilized to get the total number of unique cache entries without counting the same entry more than once. The cache activeness ratio may then be calculated as the total number of unique active cache entries that were accessed over the designated portion of the time period divided by the total number of cache entries to which the counter corresponds.

Accordingly, methods for determining internal cache activeness and for cache reclamation are performed by systems and devices, as described herein. Embodiments herein are directed to on-premises and cloud-based systems, such as but not limited to, database (DB) systems (including relational DB systems) and hosts thereof, project development systems, code repository systems, service systems, etc., as well as to client/user systems and/or devices, by which a system, a user, or an administrator submits gains access by login procedures and/or submits DB queries and operations that perform respective actions. A cloud-based DB host or a stand-alone DB server host as described herein is configured to determine internal cache activeness and perform cache reclamation, according to embodiments. For example, in online database hosting by third parties, a cloud-based host may support multiple tenants and their database deployments, such as with "Serverless" host offerings in Azure® SQL Server® DB from Microsoft Corporation of Redmond, Wash.

Accordingly, the embodiments herein provide solutions to issues for cache allocation and tracking cache activeness, for example in DB server hosts including "Serverless" implementations, by instantiating arrays of counters associated with a cache that count accesses to unique cache entries over a time period enabling robust, efficient, and extensible determinations for cache activeness to enable dynamic cache configurations such as reclamation. These and other embodiments for determining internal cache activeness and for cache reclamation will be described in further detail below in association with the Figures, and in the Sections/Subsections that follow.

Figure 1:
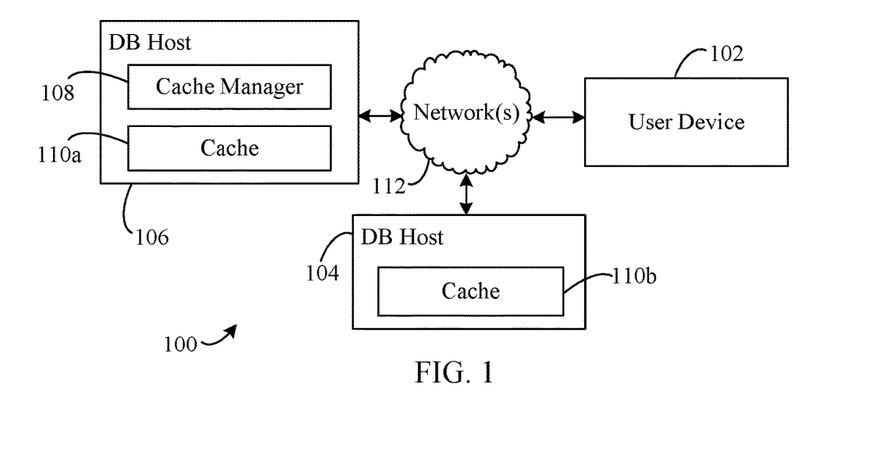
FIG. 1 shows a block diagram of a system for determining internal cache activeness and for cache reclamation, according to an example embodiment.

Systems, devices, and apparatuses may be configured in various ways for determining internal cache activeness and for cache reclamation. For instance, FIG. 1 is a block diagram of a system 100, according to embodiments. System 100 is configured for determining internal cache activeness and for cache reclamation, according to embodiments. As shown in FIG. 1, system 100 includes a user device 102, a database (DB) host 104, and a DB host 106. In embodiments, user device 102, DB host 104, and DB host 106 communicate with each other over a network 112. It should be noted that in various embodiments different numbers of user devices and/or DB hosts are present. Additionally, according to embodiments, any combination of the systems and/or components illustrated in FIG. 1 are present in system 100. For example, an embodiment of system 100 comprises DB host 106, with or without client device 102.

Network 112 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments.

DB host 106 comprises one or more server computers or computing devices, which may include one or more distributed or "cloud-based" servers, in embodiments. In embodiments, DB host 106 is associated with, or is a part of, a cloud-based service platform, and in some embodiments, DB host 106 comprises an on-premises server(s) in addition to, or in lieu of, cloud-based servers. DB host 106 is configured to host and execute any type of DB server application (not shown for brevity and illustrative clarity), such as but not limited to, SQL Server® from Microsoft Corporation of Redmond, Wash., including services thereof such as "Serverless" deployments of customer DBs. Various systems/devices herein, such as DB host 106, are configured to receive requests for executing queries against a DB, e.g., from user device 102, and are configured to perform functions/operations for determining internal cache activeness and for cache reclamation for associated DB servers, according to embodiments.

For instance, in embodiments, DB host 106 includes one or more caches ("cache") 110a and a cache manager 108 that is configured to perform functions/operations for determining internal cache activeness and for cache reclamation. Such functions/operations may include, without limitation, efficiently calculating internal cache activeness of a given cache or group of caches of the same type via monitoring the cache(s) over a sliding time period that is implemented as a data structure with a fixed number of indexed elements or buckets associated with the cache(s), where each bucket represents a fixed time window in the time period (e.g., by timestamp) and tracks the number of unique cache entries last accessed during the time window using a respective counter. Cache manager 108 is configured to determine the total number of active entries for cache(s) (e.g., accessed cache entries) over the time period from the counters by enumeration through the buckets whose time windows are within a designated portion of the time period for the total number of unique cache entries without counting the same entry more than once. The cache activeness ratio may then be calculated by cache manager 108 based on the values of counters and the total number of entries in the cache(s).

Cache 110a includes one or more caches of one or more different types, in embodiments, such as those used for tracking user logins and/or security tokens, for column stores, for functions and operations associated with DB server operations, and/or the like. In embodiments, cache 110 includes, but is not limited to, one or more of buffer pools, large cache stores, cache stores, user stores, object stores, SQL Operating System (SOS) stores, etc. In embodiments, cache manager 108 includes one or more arrays of counters by which accesses to unique cache entries are tracked and from which activeness determinations and cache configurations (e.g., reclamations) are made.

As noted and as described herein, DB host 106 is applicable to any type of system for determining internal cache activeness and for cache reclamation, according to embodiments. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as DB servers hosted by DB host 106, etc., are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants. In some embodiments herein, tenants of cloud-based implementation services may lease or "pay as you go" for processing and memory resources, including cache allocations, which are monitored for determining internal cache activeness and for cache reclamation.

DB 104 comprises one or more storage devices and/or storage systems, which include distributed or "cloud-based" devices/systems as well as on-premises devices and/or systems, in embodiments, and may be similarly configured as DB host 106 to host a DB server. DB host 104 also includes one or more caches ("cache") 110b that may be similarly configured as cache 110a, or in any way as described above for cache 110a. Cache 110b of DB host 104 is shown to illustrate that in some embodiments, cache manager 108 of DB host 106 may be configured to perform its functions/operations with respect to a cache(s) on another host, e.g., cache 110b of DB host 104.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein, as well as for performing client-side functions/operations of client-server scenarios associated with embodiments. In embodiments, user device 102 may be a device of a tenant that utilizes DB host 106 for hosting a DB server on which a tenant DB is accesses, or may be a device of an end user that accesses the tenant DB. User device 102 may be a computing device of an end-user such as a customer, or of an administrator or internal user associated with DB host 106. User device 102 also includes additional components (not shown for brevity and illustrative clarity) including, but not limited to, components and subcomponents of other devices and/or systems herein, in some embodiments.

DB host 106 may be configured in various ways for determining internal cache activeness and for cache reclamation. For instance, referring now to FIG. 2, a block diagram of a system 200 is shown for determining internal cache activeness and for cache reclamation, according to an example embodiment. System 200 is configured to be an embodiment of system 100 of FIG. 1, e.g., DB host 106. System 200 is described as follows.

Figure 2:
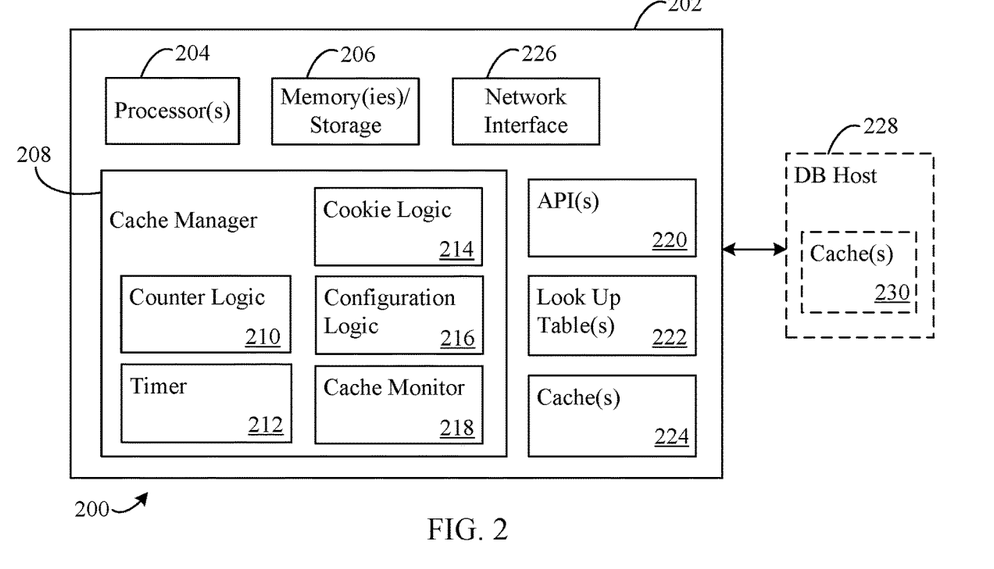
FIG. 2 shows a block diagram of a computing system configured for determining internal cache activeness and for cache reclamation, according to an example embodiment.

System 200 includes a computing system 202, which is an embodiment of DB host 106 of FIG. 1, in embodiments, and which is any type of server or computing system, as mentioned elsewhere herein, or as otherwise known, including one or more cloud-based servers that support multi-tenancies. As shown in FIG. 2, computing system 202 includes one or more processors ("processor") 204, one or more of a memory and/or other physical storage device ("memory") 206, as well as one or more network interfaces ("network interface") 226. Computing system 202 includes one or more caches ("cache(s)") 224 which may be an embodiment of cache 110a of FIG. 1, and a cache manager 208 that is an embodiment of cache manager 108 of FIG. 1. Cache manager 208 is configured to perform aspects of determining internal cache activeness and cache reclamation, as described herein, including but without limitation, those described above for cache manager 108 of FIG. 1, and/or the like. In embodiments, while not shown for brevity and illustrative clarity, cache manager 208 comprises a portion of a DB server application/service. Computing system 202 also includes one or more application programming interfaces (APIs) 220 configured to increment and decrement counters in buckets of buffers in a lock-free manner, including for multi-threading accesses, as would be understood by one of skill in the relevant art(s) having the benefit of this disclosure, and one or more look up table(s) 222 that store cache cookie data objects which include data and information associated with counters and that are linked to cache entries as described herein. In embodiments, look up table(s) 222 may be stored in memory 206, and cache(s) 224 may comprise a portion of memory 206.

System 200 also includes additional components (not shown for brevity and illustrative clarity) including, but not limited to, components and subcomponents of other devices and/or systems herein, as well as those described below with respect to FIG. 10, such as an operating system, according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently, and cores of processor 204 may be grouped with portions of memory 206 and/or cache(s) 224 as processing resources allocated for hosting services, as described herein, and for which cache activeness ratios are determined. Processor 204 may comprise circuitry that is configured to execute computer program instructions such as, but not limited to, embodiments of cache manager 208, including one or more of the components thereof as described herein, and/or ones of APIs 220, which may be implemented as computer program instructions, as described herein. As noted above, cache(s) 224 may be implemented in memory 206.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, cache manager 208, including one or more of the components thereof as described herein, API(s) 220, and/or look up table(s) 222, etc.

Network interface 226 may be any type or number of wired and/or wireless network adapter, modem, etc., configured to enable system 200, including computing system 202, to communicate with other devices and/or systems over a network, including cloud networks, such as communications between computing system 202 and other devices, systems, hosts, of system 100 in FIG. 1 over a network such as network 112.

Cache manager 208 of computing system 202 includes a plurality of components for performing the functions and operations described herein for determining internal cache activeness and for cache reclamation, in embodiments, such as for ones of cache(s) 224. As illustrated, cache manager 208 includes counter logic 210, a timer 212, cookie logic 214, configuration logic 216, and a cache monitor 218, although additional components, as described herein or otherwise, are also included in some embodiments.

Counter logic 210 is configured to determine when counters in buckets of arrays are to be incremented and/or decremented based on accesses to cache entries. Counter logic 210 is configured to make calls to ones of API(s) 220 to affect counter increments and decrements. In embodiments, counter logic 210 makes such determinations based on information from timer 212 and/or cookie logic 214, as described herein. Counter logic 210 is configured to manage counters for a cache(s) such that each cache entry therein is only counted once; that is, when a current-time counter is incremented for an access to a cache entry, a prior-time counter that was previously incremented for the cache entry is decremented, according to embodiments.

Timer 212 may be configured to track a current time and to update the current time for a header or pointer associated with buckets in arrays of counters. Timer 212 may be configured to run a timer thread for time windows corresponding to buckets in the arrays, e.g., a time window of 1 minute, in embodiments, where the current time for the header or pointer is updated after each time window expires, as described next in association with logical time stamps for cache cookies. Further details regarding timer 212 and time windows are provided below with respect to FIGS. 4 and 7.

Cookie logic 214 is configured in embodiments to generate and update cache cookies, which comprise data objects. A cache cookie identifies a unique, corresponding cache entry and may include one or more of a time stamp associated with the most recent access to the cache entry and a bucket index associated with the bucket in which a counter was incremented for the access. In embodiments, the time stamp may be a logical time stamp that also functions as a logical bucket index, where a cache cookie comprises the logical time stamp as the logical bucket index. A current bucket may be identified using a logical time stamp via a modulo operation, e.g., the current bucket is determined as the logical bucket index % the number of total buckets. As a non-limiting example, with 60 buckets in an array of counters, a logical time stamp of 23 would correspond to a current bucket with an index of 23 (i.e., 23% 60), and a logical time stamp of 83 (as the logical time stamp wraps around for a circular array/buffer) would also correspond to a current bucket with an index of 23 (i.e., 83% 60), whereas a logical time stamp of 95 would correspond to a current bucket with an index of 35 (i.e., 95% 60). To identify a stale, i.e., a previous, logical bucket index that is not associated with the current time window, it may be determined that the logical bucket index is less than the largest logical bucket index minus the number of total buckets, in embodiments. Cookie logic 214 is configured to generate cache cookies on a first access to cache entries, to update cache cookies on subsequent accesses to the cache entries, and/or to store cache cookies in look up table(s) 222.

Configuration logic 216 is configured in embodiments to generate commands that cause a cache(s) to be configured, including allocation of additional memory to the cache(s) and/or reclamation for the cache(s) based on determined cache activeness ratios, as described herein.

Cache monitor 218 is configured to monitor a cache(s) for accesses thereto, including reads, writes, deletions, etc., and may comprise a portion of, or be associated with, a query processor or operating system (not shown for brevity) that performs lookups in look up table(s) 222 to denote cache entries as being active, e.g., via cookie logic 214 described above.

While embodiments herein allow for cache manager 208 to perform its functions and operations on cache(s) 224 in computing system 202, some embodiments allow for cache manager 208 to perform its functions and operations on a cache(s) 230 in a computing system 230 that may be in communication with computing system 202 via a network as described herein.

As noted above for FIGS. 1 and 2, embodiments herein provide for determining internal cache activeness and for cache reclamation. System 100 of FIG. 1 and/or system 200 of FIG. 2 may be configured to perform such functions and operations. It is further contemplated that the systems and components described above are configurable to be combined in any way. For example, cache(s) 224 are a portion of memory 206 in embodiments, and one or more components of cache manager 208 may comprise a portion of a DB server, an operating system, etc., or may be stand-alone components in embodiments.

Figure 3:
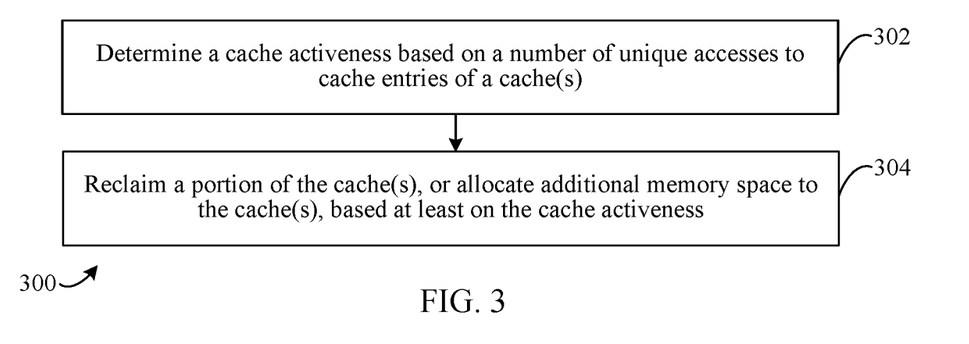
FIG. 3 shows a flowchart for determining internal cache activeness and for cache reclamation, in accordance with an example embodiment.

Turning now to FIG. 3, a flowchart 300 for determining internal cache activeness and for cache reclamation is shown, according to example embodiments. System 100 in FIG. 1 and/or system 200 in FIG. 2 operate according to flowchart 300, in embodiments. Further structural and operational examples will be apparent to persons skilled in the relevant art(s) based on the following descriptions. Flowchart 300 is described below with respect to system 200 of FIG. 2.

Flowchart 300 begins with step 302. In step 302, a cache activeness is determined based on a number of unique accesses to cache entries of a cache(s). For instance, cache manager 208 in FIG. 2 (e.g., via counter logic 210, timer 212, cookie logic 214, and/or cache monitor 218 described above) is configured to determine a cache activeness for a cache or for caches of the same type by determining a cache activeness ratio as described above by tracking how many cache entries are active during a portion of a time period that is divided into time windows having corresponding counters. The counters are enumerated for the portion of the time window, and the number of unique cache entries active over the portion are divided by the total number of cache entries in the cache(s) to determine the cache activeness ratio for the cache(s), e.g., by counter logic 210, configuration logic 216, and/or cache monitor 218.

In step 304, a portion of the cache(s) is reclaimed, or additional memory space is allocated to the cache(s), based at least on the cache activeness. For example, a reclaim threshold may be set for a cache activeness ratio, and if the determination in step 302 indicates that the cache activeness ratio for the cache(s) is less than, or less than or equal to, the reclaim threshold, e.g., 30% or 0.3, a portion of the cache(s) may be reclaimed via a command generated by, or caused to be generated by, configuration logic 216 of cache manager 208 in FIG. 2. That is, if the cache(s) are determined to be underutilized, reclamation may be performed. In another example, an allocation threshold may be set for a cache activeness ratio, and if the determination in step 302 indicates that the cache activeness ratio for the cache(s) is greater than, or greater than or equal to, the allocation threshold, e.g., 70% or 0.7, additional memory space for the cache(s) may be allocated via a command generated by, or caused to be generated by, configuration logic 216 of cache manager 208. That is, if the cache(s) are determined to be over-utilized, additional cache allocation may be performed. In yet another example, if the determination in step 302 indicates that the cache activeness ratio for the cache(s) is between the reclaim threshold and the allocation threshold, the size of the cache(s) may be maintained.

Figure 4:
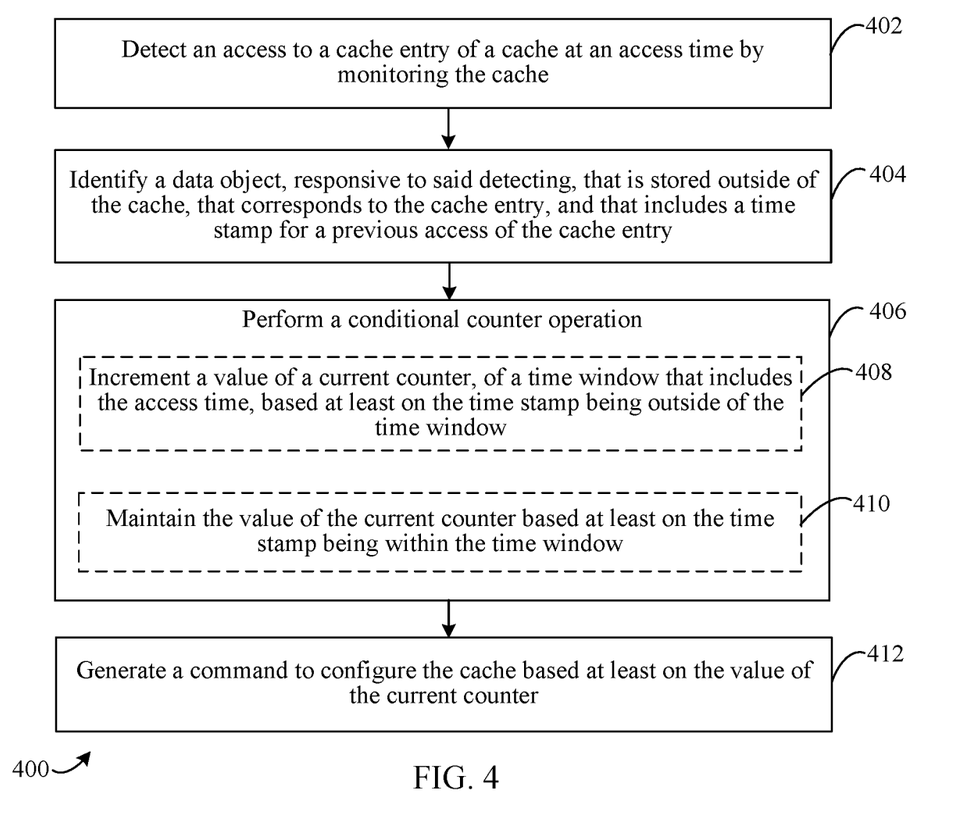
FIG. 4 shows a flowchart for determining internal cache activeness and for cache reclamation, in accordance with an example embodiment.

FIG. 4 shows a flowchart 400 for determining internal cache activeness and for cache reclamation is shown, according to example embodiments. System 100 in FIG. 1 and/or system 200 in FIG. 2 operate according to flowchart 400, which is an embodiment of flowchart 300 of FIG. 3. Further structural and operational examples will be apparent to persons skilled in the relevant art(s) based on the following descriptions. Flowchart 400 is described below with respect to system 200 of FIG. 2.

Flowchart 400 begins with step 402. In step 402, an access to a cache entry of a cache is detected at an access time by monitoring the cache. For instance, cache monitor 218 of cache manager 208 in FIG. 2 is configured to monitor a cache(s) for accesses thereto. Cache monitor 218 is configured to monitor cache(s) for accesses to cache entries as a portion of, or in association with, a query processor or operating system of computing system 202. When an access to a cache entry is requested/made, e.g., for a query plan in performance of a query against a DB, cache monitor 218 performs lookups in look up table(s) 222 based on the cache entry address or other identifier. Thus, cache entries are denoted as being active, e.g., via cookie logic 214, as described herein.

In step 404, a data object is identified, responsive to said detecting, that corresponds to the cache entry, and that includes a logical time stamp for a previous access of the cache entry. For example, when cache monitor 218 determines an access to a cache entry is made in step 302, cookie logic 214 of cache manager 208 in FIG. 2 is configured to identify a data object such as a cache cookie in look up table(s) 222 that corresponds to the cache entry. On a first access to the cache entry, cookie logic 214 is configured to generate the data object in association with the cache entry being accessed. As noted above, cache cookie data objects identify their associated cache entries, and may include a logical time stamp corresponding to the most recent access that also functions as a logical bucket index associated with the bucket of an array in which a counter is to be/was incremented for the access. If a prior access to the cache was made, as is evidenced by the existence of a cache cookie data object and its data/information, the corresponding cache cookie data object is identified by cookie logic 214.

In step 406, a conditional counter operation is performed. For instance, counter logic 210 is configured to perform conditional counter operations on counters in buckets of arrays for the cache(s) being accessed. Conditional counter operation include, without limitation, incrementing a counter, decrementing a counter, and/or maintaining a value of a counter. In embodiments, the conditional counter operation may be step 408 or step 410 described below.

In step 408, a value of a current counter, of a time window that includes the access time, is incremented based at least on the logical time stamp being outside of the time window. For example, counter logic 214 of cache manager 208 in FIG. 2 is configured in embodiments to increment a value of a current counter via a call to an API of API(s) 220 in FIG. 2, which may be a lock-free API. A current counter is associated with the current time as maintained by timer 212 of cache manager 208 in FIG. 2 by reference to the bucket, associated with the counter, which includes a time window. When the current time maintained by counter 212 is within the time window of the bucket, the counter in that current bucket is the current counter. The current bucket may have a pointer or be designated as the header of the array of counters based on timer 212. When the information in the cache cookie data object from step 404 above indicates that the most recent access to the cache entry is prior to the current time window, the current bucket is identified by its array index being at the head of the array, and the current counter is incremented to track the current access to the cache entry.

In step 410, the value of the current counter is maintained based at least on the logical time stamp being within the time window. For instance, counter logic 214 is configured to maintain the value of the current counter when the time stamp in the cache cookie data object for the cache entry is within the time window for the current bucket that includes the current counter. That is, when the current counter was previously incremented during the time window for the current bucket, a previous access to the cache entry is already reflected by the current counter, and therefore, the current counter does not need to be incremented again (i.e., the embodiments herein track accesses to unique, or distinct, cache entries, but do not count a cache entry more than once regardless of the number of accesses thereto—only the most recent access to a given cache entry is tracked by the counters). In embodiments, the conditional counter operation in step 410 may comprise a no operation or no-op/NOP, or may be characterized as maintaining the current counter value and updating the cache cookie data objection information/data, as described below.

In step 412, a command is generated to configure the cache based at least on the value of the current counter. For instance, configuration logic 216 is configured in embodiments to generate commands for configuring the cache for which access to the cache entry was made. As described herein, configuration commands include, but are not limited to, commands that cause a cache(s) to be reclaimed for under-utilization, in whole or in part, or that cause additional memory to be allocated to the cache(s) when the cache(s) is over-utilized. In embodiments, these commands are generated based on cache activeness ratios derived, e.g., by counter logic 210, configuration logic 216, and/or cache monitor 218, from the values of the counters in the arrays of counters for a given cache, which include the current counter.

Figure 5:
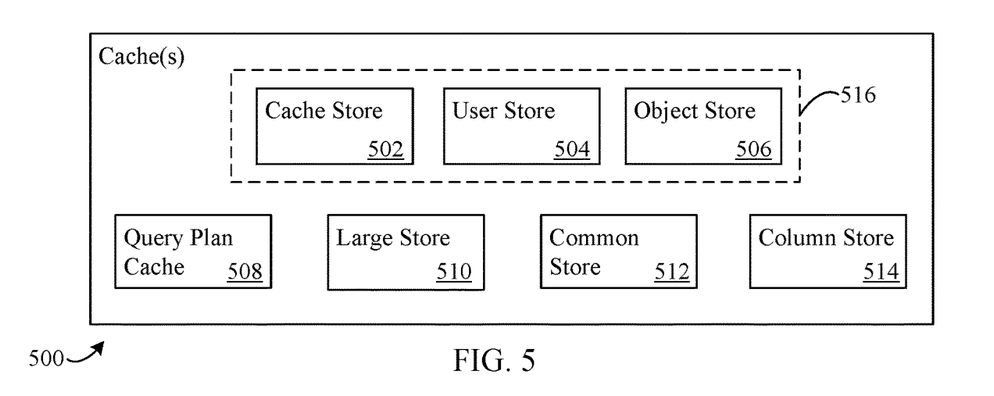
FIG. 5 shows a block diagram of system caches for determining internal cache activeness and for cache reclamation, in accordance with an example embodiment.

FIG. 5 shows a block diagram of system caches 500 for determining internal cache activeness and for cache reclamation, according to an example embodiment. System caches 500 may be an embodiment of cache(s) 224 of system 200 in FIG. 2. As illustrated, system caches 500 includes several caches of various cache types, and it should be understood that this representation is exemplary in nature, and that more or fewer caches may be present in different embodiments, as well as additional caches. For example, in some embodiments, a cache(s) for user logins to a system and associated security tokens may be included in system caches 500.

In FIG. 5, system caches 500 include a cache store 502, a user store 504, and an object store 506, which are of the same type in embodiments and may be logically referenced together as a cache group 516 for determining internal cache activeness and for cache reclamation. That is, in embodiments, a single array of counters may be used for tracking accesses to cache entries of cache store 502, user store 504, and object store 506 as cache group 516. However, embodiments are not so limited and also provide for each cache of system caches 500 having its own array of counters. System caches 500 is also shown as exemplarily including a query plan cache 508, a large store 510, a common store 512, and a column store 514, as would be understood by those of skill in the relevant art(s) having the benefit of this disclosure. It is also contemplated herein that one or more of the caches shown in system caches 500 may be portions of, or combined with, other caches therein.

Figure 6:
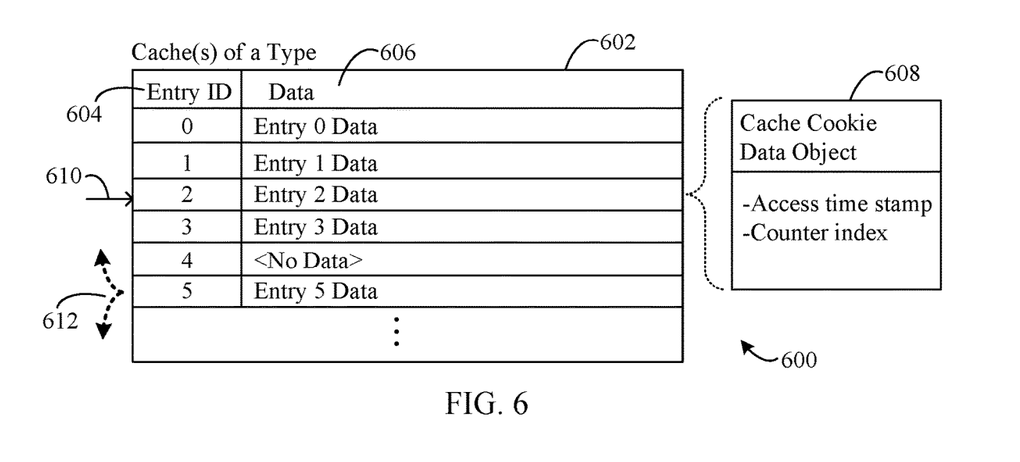
FIG. 6 shows a block diagram of a cache implementation that includes a cache and a cache cookie data object for determining internal cache activeness and for cache reclamation, in accordance with an example embodiment.

FIGS. 6 and 7 will now described with reference to FIGS. 2 and 4. FIG. 6 shows a block diagram of a cache implementation 600 that includes a cache 602 and a cache cookie data object 608 for determining internal cache activeness and for cache reclamation. Cache 602 may be an embodiment of any cache, or cache group of a type, described above, e.g., with reference to FIGS. 1, 2, and/or 5, and comprise a portion of memory 206 of FIG. 2, and cache cookie data object 608 may be generated, stored, and/or maintained in look up table(s) 222 of FIG. 2. Cache 602 includes a plurality of cache entries having entry identifiers 604 and associated data fields 606.

Figure 7:
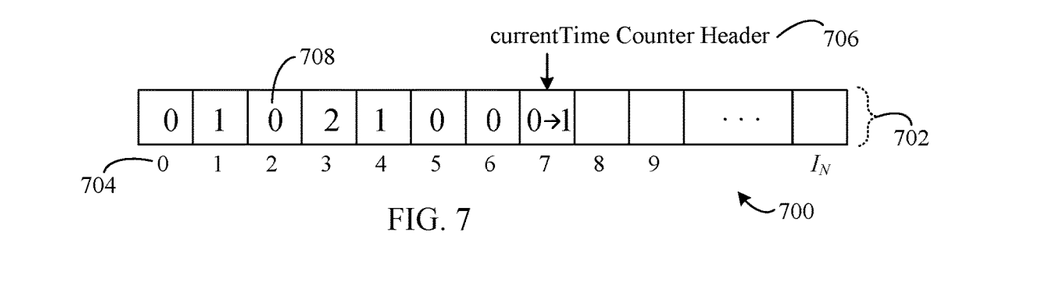
FIG. 7 shows a block diagram of an array of cache counters for determining internal cache activeness and for cache reclamation, in accordance with an example embodiment.

FIG. 7 shows a block diagram of an array 700 of cache counters for determining internal cache activeness and for cache reclamation, according to an example embodiment. Array 700 may be a circular array or buffer of buckets 702, or elements, with respective, associated indices 704. Buckets 702 include respective counters 708, each having a counter, stored and maintained memory 206 of FIG. 2, and that is incremented or decremented by counter logic 210, e.g., via a call to an API, as noted herein. The number "$I_N$" of indices 704 corresponds to the time period set for monitoring and determining internal cache activeness (e.g., 1 (one) hour) and the size of the time windows (e.g., 1 (one) minute) for each of buckets 702. In such an example, $I_N$ is 60, thus there are 60 buckets 702 and corresponding, respective counters 708 that are updated as being the current counter, in a circular manner as the sliding time period progresses with respect to real time, based on a header pointer 706 that may be assigned via counter logic 210 and/or timer 212 of FIG. 2 using a call to an API of API(s) 220.

With respect to FIGS. 6 and 7, and example operational scenario is now described for illustrative purposes where array 700 has 60 buckets, each bucket having a 1 minute time window. For instance, as noted above in step 402 of flowchart 400 in FIG. 4, a cache such as cache 602 is monitored for accesses to cache entries thereof by cache monitor 218 of cache manager 208 in FIG. 2. As shown in cache 602 and array 700, there were no accesses to unique cache entries of cache 602 for which tracking is maintained during a prior time window corresponding to the bucket with index 0 (zero), there was an access to 1 (one) unique cache entry during a prior time window corresponding to the bucket with index 1 (one), there were no accesses to unique cache entries of cache 602 for which tracking is maintained during a prior time window corresponding to the bucket with index 2, there were two access to unique cache entries during a prior time window corresponding to the bucket with index 3, there was an access to 1 (one) unique cache entry during a prior time window corresponding to the bucket with index 4, and there were no accesses to unique cache entries of cache 602 for which tracking is maintained during prior time windows corresponding to the buckets with index 5 and with index 6. It should be noted that no cache entry accesses for which tracking is maintained in a given bucket may correspond to no accesses, or to an accesses to a specific cache entry that was counted by a counter (incremented) but was later decremented due to a subsequent access to the specific cache entry.

During the current time window, header pointer 706 of array 700 is shown as pointing to the bucket of buckets 702 having the index 7 of indices 704. An access 610 to a cache entry of cache 602, e.g., for Entry ID 2, may access Entry 2 Data to this cache entry. If cache cookie data object 608 exists from a prior access to this cache entry, the access time stamp is checked against the current time window maintained by timer 212, and when the access time stamp is prior to the current time window, cache cookie data object 608 is updated to include the current time as its access time stamp and to identify index 7 of the current bucket with the current counter. Prior to access 610, the counter at bucket index 7 has a value of 0 (zero) indicating that no accesses to cache 602 have been made in the current time window, in this example. The counter in the bucket with index 7 is incremented from 0 to 1 to track this cache entry access, the bucket with index 7 is known to be the current bucket based on the time window therefor and/or on header pointer 706, and it is known that the current bucket counter is to be incremented to track the access to this specific cache entry because the prior access was not made in the current time window according to the information in cache cookie data object 608.

Additionally, in some cases, cache cookie data object 608 may not yet be created if no prior accesses to this cache entry have been made. When access 610 is detected for Entry ID 2, cache cookie data object 608 may be generated to be associated with this cache entry and to include the current time for its access time stamp and index 7 as its counter index because the counter at index 7 has a time window that corresponds to the current time, and the counter at index 7 is incremented from 0 to 1 to track the access to this cache entry.

In an alternate scenario, an access to the cache entry of cache 602 for Entry ID 2, may have accessed Entry 2 Data, e.g., in the previous time window corresponding to the bucket with index 2. In this case, prior to access 610, the counter for the bucket with index 2 would have a value of 1 (one). However, when access 610 occurs and the counter at bucket index 7 is incremented, the counter at bucket index 2 would be decremented so that only the counter at bucket index 7 denotes an access for this specific cache entry. It should be noted that this alternate scenario holds for any number of previous accesses in prior time windows to the cache entry of cache 602 for Entry ID 2.

In another alternate scenario, as described for step 410 of flowchart 400 in FIG. 4, the counter at bucket index 7 is incremented only once during the current time window for this bucket even if the cache entry of cache 602 for Entry ID 2 is accessed more than once within the current time window. In such a case, when cache cookie data object 608 is identified for this cache entry, the access time stamp of cache cookie data object 608 is within the current time window of the counter at bucket index 7, and therefore counter logic 210 does not increment the counter, but rather maintains the counter's value.

In the scenarios for cache 602 and array 700 described above, when header pointer 706 points to the bucket with index $I_N$ of buckets 702 as the current time bucket, and the time window of this bucket expires, counter logic 210 overwrites counter for the bucket with index 0 (zero) and reinitializes the counter, and associates a new current time window for the current time with this bucket, i.e., array 700 is configured as a circular array/buffer that only tracks cache entry accesses for the a last amount of time equal to the time period of array 700.

To calculate the total number of unique active entries for cache 602, embodiments allow for enumeration through one or more of buckets 702. For instance, buckets 702 whose time windows are within a threshold amount of time before the current time, e.g., 1 minute, 5 minutes, 10 minutes, 15 minutes, 30 minutes, etc., including over the entire time period that spans the time windows of array 702, are enumerated, and the counters of the designated buckets are utilized, e.g., summed, to get the total number of unique cache entries without counting the same entry more than once. In an example, if when the current time window expires and the bucket with index 8 of buckets 702 is initialized with an associated counter of counters 708, a number of accesses for activeness of cache 602 may be determined over the last 5 minutes, i.e., in the previous 5 buckets—time windows being 1 (one) minute in this example. That is, the buckets with indices 3 through 7 are enumerated over, and their respective counters are summed together. In this example, the number of unique cache entries accessed would be 4 (sum[2, 1, 0, 0, 1]) over the prior 5 minutes. If the total number of entries in cache 602 is 5, as exemplarily shown, the cache activeness ratio may then be calculated, e.g., by counter logic 210, configuration logic 216, and/or cache monitor 218, as the total number of unique active cache entries that were accessed over the designated portion of the time period divided by the total number of cache entries to which the counter corresponds: here, the ratio would 4 accessed entries divided by 5 total entries, or 0.8. If buckets with indices 3 and 4 did not have respective counter values of 2 and 1 (one), then the operation would be (sum[0, 0, 0, 0, 1]) over the prior 5 minutes, for a cache activeness ratio of 1 accessed entry divided by 5 total entries, or 0.2. Accordingly, the cache activeness ratio is determined in the described embodiments based on the values of the counters, rather than enumerating over all cache entries to determine which cache entries were active during the designated time.

Based on the determined cache activeness, configuration logic 216 is configured to generate a command to configure the cache, as described in step 412 of flowchart 400 in FIG. 4. The command may cause the cache to be expanded by allocating additional memory, or to be contracted or reclaimed, as illustrated by a configuration effect 612 for cache 602 in FIG. 6.

Figure 8:
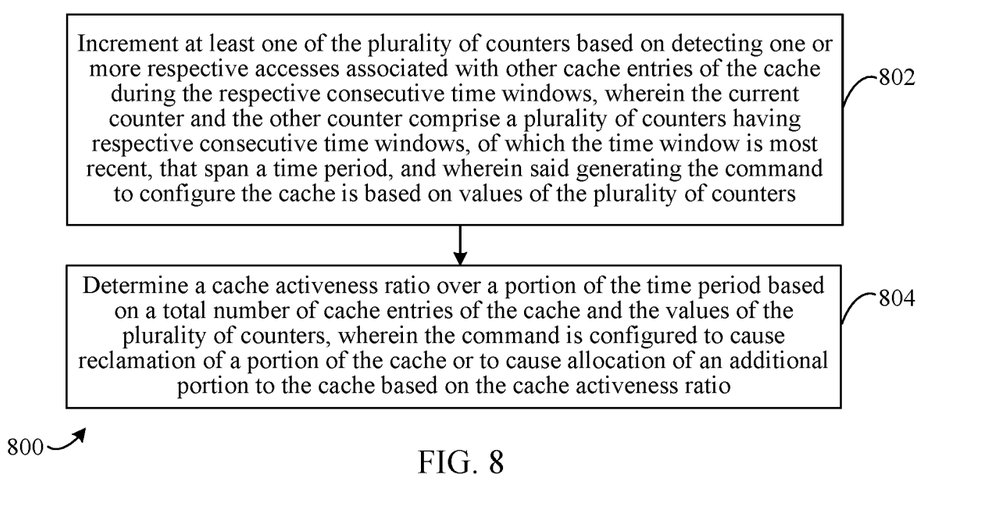
FIG. 8 shows a flowchart for determining internal cache activeness and for cache reclamation, in accordance with an example embodiment.

Turning now to FIG. 8, a flowchart 800 for determining internal cache activeness and for cache reclamation is shown, according to an example embodiment. System 100 in FIG. 1 and/or system 200 in FIG. 2 operate according to flowchart 800, which is an embodiment of flowchart 400 of FIG. 4. Further structural and operational examples will be apparent to persons skilled in the relevant art(s) based on the following descriptions. Flowchart 800 is described below with respect to system 200 of FIG. 2 as well as FIGS. 6 and 7.

Flowchart 800 begins at step 802. In step 802, at least one of the plurality of counters is incremented based on detecting one or more respective accesses associated with other cache entries of the cache during the respective consecutive time windows, wherein the current counter and the other counter comprise a plurality of counters having respective consecutive time windows, of which the time window is most recent, that span a time period, and wherein said generating the command to configure the cache is based on values of the plurality of counters. For example, as described above with respect to FIGS. 6 and 7, one or more of counters 708 in buckets 702 of array 700 are incremented and/or decremented based on unique cache entries accessed during respective, consecutive time windows when the current time is within a given time window. The configuration commands generated by configuration logic 216 of FIG. 2 are ultimately based at least on the number of unique cache entries accessed during the designated, consecutive time windows as reflected by ones of counters 708 in the enumerated buckets of buckets 702 of array 700.

In step 804, a cache activeness ratio is determined over a portion of the time period based on a total number of cache entries of the cache and the values of the plurality of counters, wherein the command is configured to cause reclamation of a portion of the cache or to cause allocation of an additional portion to the cache based on the cache activeness ratio. For example, as described above with respect to FIGS. 6 and 7, one or more of counters 708 in buckets 702 of array 700 are utilized to determine a number of unique cache entries accessed over a specified time range made up of time windows of the buckets for which counters are summed. Given the number of unique cache entries accessed for cache 602, and the total number of cache entries for cache 602 being known or determined, cache manager 208 via one or more components thereof is configured to determine the cache activeness ratio by dividing the number of unique cache entries by the total number of cache entries. The configuration commands generated by configuration logic 216 of FIG. 2 are based at least on the determined cache activeness ratio, and are configured to cause reclamation of a portion of the cache or to cause allocation of an additional portion to the cache, as illustrated by configuration effect 612 in FIG. 6.

Embodiments also support multi-threaded accesses to caches and entries thereof in a lock free manner. For instance, in a given thread, when a cache entry access is detected, a read of an existing cache cookie data object may be performed, and this version of the cache cookie data object is associated with an identifier designating it as "old" or the like. The bucket associated with the current time window is identified, as described herein, and the counter of this bucket is incremented. Subsequently, a "new" cache cookie data object may be generated that is associated with the current time window and corresponding bucket (e.g., by index, logical time stamp, etc.). The "old" cache cookie data object is then utilized to identify the previous bucket having a corresponding counter, that tracked the last access to the cache entry detected as being currently accessed, and this corresponding counter is decremented. Next, a lock free API as described herein, via interlocked compare exchange is utilized to compare the cache cookie data object with the "old" version and exchange it with "new" version. If the lock free API call succeeded, then there was not a race condition, and the update ends. Otherwise, another thread was accessing the same cache entry at the same time, and because the updating of counters and the cache cookie data object were successful in the other thread, the current thread counter updates are rolled back based at least on the versions of the cache cookie data object, e.g., decrement the counter of the bucket identified from the "new" version, and increment the counter of the bucket identified from "old" version.

Additional embodiments herein also provide for variations on those described above. For instance, in implementations of the embodiments described herein, cache entries may be deleted. In such scenarios, a counter that was incremented to track access to the now-deleted cache entry is modified to reflect the deletion in determinations of cache activeness ratios.

Figure 9:
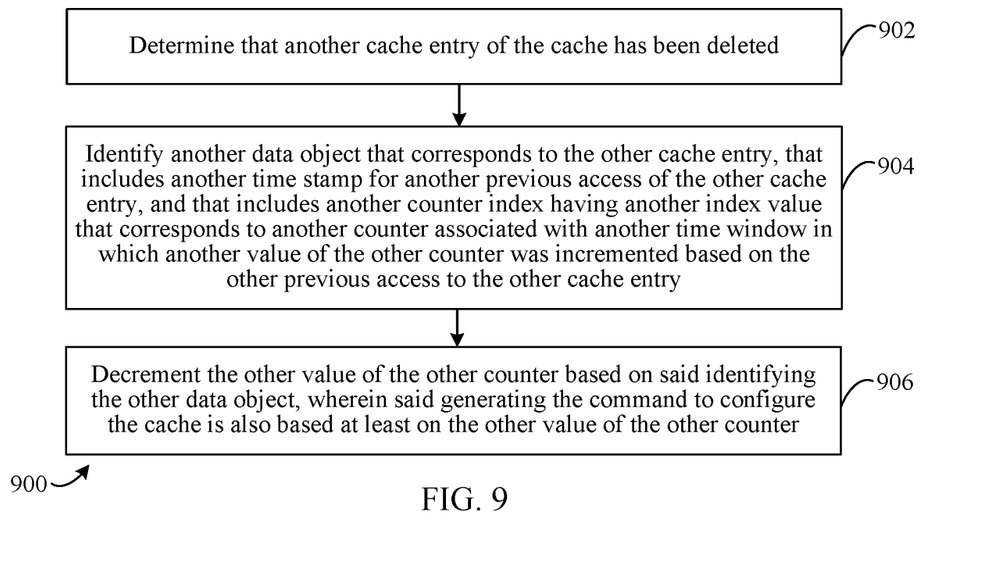
FIG. 9 shows a flowchart for determining internal cache activeness and for cache reclamation, in accordance with an example embodiment.

Turning now to FIG. 9, a flowchart 900 for determining internal cache activeness and for cache reclamation is shown, according to an example embodiment. System 100 in FIG. 1 and/or system 200 in FIG. 2 operate according to flowchart 900, which is an embodiment of flowchart 400 of FIG. 4. Further structural and operational examples will be apparent to persons skilled in the relevant art(s) based on the following descriptions. Flowchart 900 is described below with respect to system 200 of FIG. 2 as well as FIGS. 6 and 7.

Flowchart 900 begins at step 902. In step 902, it is determined that another cache entry of the cache has been deleted. For instance, cache monitor 218 is configured to monitor a cache for deletions of cache entries, as similarly described above for cache entry accesses.

In step 904, another data object is identified that corresponds to the other cache entry, that includes another time stamp for another previous access of the other cache entry, and that includes another counter index having another index value that corresponds to another counter associated with another time window in which another value of the other counter was incremented based on the other previous access to the other cache entry. For example, a cache cookie data object, e.g., as shown for cache cookie data object 608 in FIG. 6, for the cache entry that was determined to be deleted in step 902 is identified. As an example, assume for this portion of the description that the cache entry for Entry ID 2 was just deleted. The cache cookie data object corresponds to the deleted cache entry, and includes a time stamp for a previous access to the now-deleted cache entry, as well as an index for the counter or bucket in the array that was incremented for the most recent access to this cache entry, e.g., index 3 for the bucket of buckets 702 in array 700 of FIG. 7, which has a counter value of 2.

In step 906, the other value of the other counter is decremented based on said identifying the other data object, wherein said generating the command to configure the cache is also based at least on the other value of the other counter. For instance, counter logic 210 of FIG. 2 is configured to decrement counters via calls to an API of API(s) 220. Continuing with the example from step 904, index 3 for the bucket of buckets 702 in array 700 of FIG. 7 was identified as having its counter value previously incremented for an access to the cache entry of cache 602. Counter logic 210 decrements this counter via an API call so that a later-determined cache activeness ratio will not include an access to a deleted cache entry.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, cache implementation 600 of FIG. 6, and array 700 of FIG. 7, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
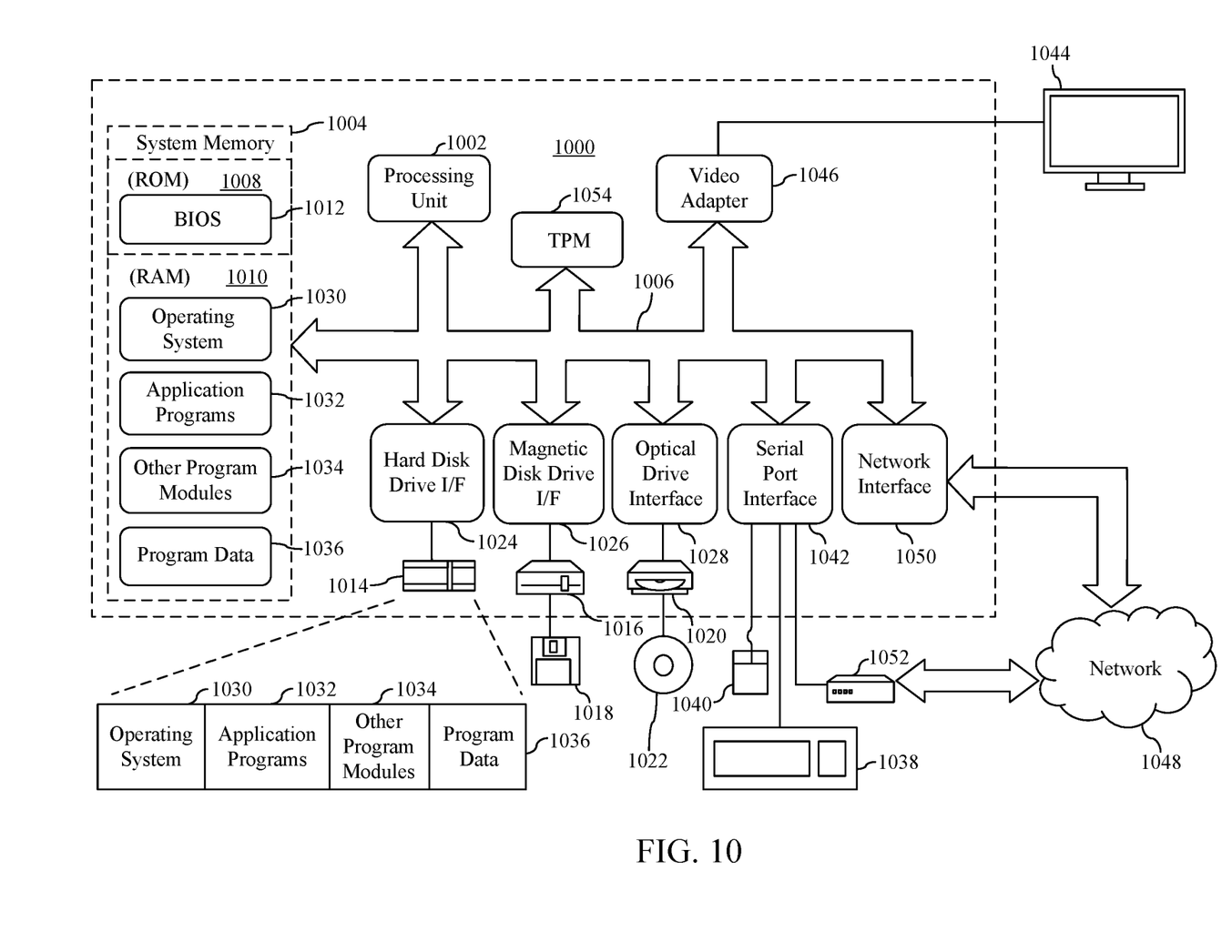
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices or systems similar to computing device 1000, or multiple instances of computing device 1000, in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, servers, and/or clusters, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, system 100 of FIG. 1, system 200 of FIG. 2, cache implementation 600 of FIG. 6, and array 700 of FIG. 7, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

TPM 1054 may be connected to bus 1006, and may be an embodiment of any TPM, as would be understood by one of skill in the relevant art(s) having the benefit of this disclosure. For example, TPM 1054 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for determining internal cache activeness and for cache reclamation. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

According to the described embodiments for determining internal cache activeness and for cache reclamation, the accesses to entries of a cache, or a group of caches of the same type, can be tracked more efficiently (e.g., fewer processing cycles, fewer memory accesses, less time, etc.) from the arrays of counters than from enumeration over all cache entries. Additionally, a cache activeness ratio is determined for any needed reconfiguration of the cache(s) such as expansion or reclamation. State of the art solutions to calculate overall cache activeness ratio iterate through each cache entry in all caches. Thus, the running time for State of the art solutions is O(MN) where M is the total number of caches and N is the average number of cache entries per cache. The running time for determinations of cache activeness ratios according to the described embodiments is O(1) as arrays of buckets with counters to track unique cache entries that are accessed are one-dimensional for their enumerations. Accordingly, the complexity, computing resources, and operational time required to determine cache activeness rations is greatly reduced to constant value in the embodiments from O(MN) in prior from the state of the art.

That is, the embodiments herein utilize a unique association of counters that correspond to accesses for unique cache entries in order to determine cache activeness ratios that drive the further allocation or reclamation of allocated cache space, while providing resource efficiencies that were previously not available for software-based services, DB server hosts, etc., much less for the specific embodiments described herein. The described embodiments can also be adapted by computing other instance level or cache level statistics or performance counters for all caches without requiring enumerating through all cache entries.

The additional examples and embodiments described in this Section may be applicable to examples disclosed in any other Section or subsection of this disclosure.

Embodiments in this description provide for systems, devices, and methods for determining internal cache activeness and for cache reclamation. For instance, a method performed by a computing system is described herein for performing such embodiments. The method includes detecting an access to a cache entry of a cache at an access time by monitoring the cache, and identifying a data object, responsive to the detecting, that corresponds to the cache entry, and that includes a time stamp for a previous access of the cache entry. The method also includes performing a conditional counter operation that includes incrementing a value of a current counter, of a time window that includes the access time, based at least on the time stamp being outside of the time window, or maintaining the value of the current counter based at least on the time stamp being within the time window, and the method also includes generating a command to configure the cache based at least on the value of the current counter.

In an embodiment of the method, the time stamp is a logical time stamp associated with an index value that corresponds to another counter associated with a previous time window in which another value of the other counter was incremented based on the previous access to the cache entry, the method further includes, prior to the performing the conditional counter operation, identifying the other counter based on the data object, and decrementing the other value of the other counter, and generating the command to configure the cache is also based at least on the other value of the other counter.

In an embodiment, the method includes, prior to the detecting the access, generating the data object to include the logical time stamp responsive to the previous access to the cache entry during the previous time window, and subsequent to the performing the conditional counter operation, updating the logical time stamp of the data object to correspond to the detection time and to identify the current counter of the time window.

In an embodiment, the method includes determining, based on a timer, that a current time is outside of the time window, instantiating another counter having another time window that begins at the current time, detecting another access to the cache entry or another cache entry of the cache at another access time within the other time window by monitoring the cache, and incrementing another value of the other counter based on the detecting the other access, where generating the command to configure the cache is also based at least on the other value of the other counter.

In an embodiment of the method, the current counter and the other counter includes a plurality of counters having respective consecutive time windows, of which the time window is most recent, that span a time period, and the method further includes, prior to the detecting the access, incrementing at least one of the plurality of counters based on detecting one or more respective accesses associated with other cache entries of the cache during the respective consecutive time windows, where generating the command to configure the cache is based on values of the plurality of counters.

In an embodiment, the method includes determining a cache activeness ratio over a portion of the time period based on a total number of cache entries of the cache and the values of the plurality of counters, where the command is configured to cause reclamation of a portion of the cache or to cause allocation of an additional portion to the cache based on the cache activeness ratio.

In an embodiment of the method, the total number of cache entries includes additional cache entries of one or more additional caches of a same type, and the other cache entries of the cache include additional cache entries of the one or more additional caches of the same type.

In an embodiment, the method includes determining that another cache entry of the cache has been deleted, identifying another data object that corresponds to the other cache entry, that includes another time stamp for another previous access of the other cache entry associated with another counter index having another index value that corresponds to another counter associated with another time window in which another value of the other counter was incremented based on the other previous access to the other cache entry, and decrementing the other value of the other counter based on the identifying the other data object, where generating the command to configure the cache is also based at least on the other value of the other counter.

A system is also described herein. The system may be configured and enabled in various ways for determining internal cache activeness and for cache reclamation, as described herein. In an embodiment, the system includes a processing system that includes one or more processors, and a memory that stores computer program instructions, that when executed, configure the processing system to detect an access to a cache entry of a cache at an access time by monitoring the cache, identify a data object, responsive to the detecting, that corresponds to the cache entry, and that includes a time stamp for a previous access of the cache entry, and perform a conditional counter operation that includes to increment a value of a current counter, of a time window that includes the access time, based at least on the time stamp being outside of the time window or maintain the value of the current counter based at least on the time stamp being within the time window. The processing system, when the computer program instructions are executed, is also configured to generate a command to configure the cache based at least on the value of the current counter.

In an embodiment of the system, the time stamp is a logical time stamp associated with an index value that corresponds to another counter associated with a previous time window in which another value of the other counter was incremented based on the previous access to the cache entry, and the processing system, prior to the performing the conditional counter operation, is further configured to identify the other counter based on the data object, and decrement the other value of the other counter, where to generate the command to configure the cache is also based at least on the other value of the other counter.

In an embodiment of the system, the processing system is further configured to, prior to detect the access, generate the data object to include the logical time stamp responsive to the previous access to the cache entry during the previous time window, and subsequent to the perform the conditional counter operation, update the logical time stamp of the data object to be the detection time and to identify the current counter of the time window.

In an embodiment of the system, the processing system is further configured to determine, based on a timer, that a current time is outside of the time window, instantiate another counter having another time window that begins at the current time, detect another access to the cache entry or another cache entry of the cache at another access time within the other time window by monitoring the cache, and increment another value of the other counter based on the detecting the other access, where to generate the command to configure the cache is also based at least on the other value of the other counter.

In an embodiment of the system, the current counter and the other counter includes a plurality of counters having respective consecutive time windows, of which the time window is most recent, that span a time period, and the processing system, prior to the detecting the access, is further configured to increment at least one of the plurality of counters based on detecting one or more respective accesses associated with other cache entries of the cache during the respective consecutive time windows, and where the generate the command to configure the cache is based on values of the plurality of counters.

In an embodiment of the system, the processing system is further configured to determine a cache activeness ratio over a portion of the time period based on a total number of cache entries of the cache and the values of the plurality of counters, and the command is configured to cause reclamation of a portion of the cache or to cause allocation of an additional portion to the cache based on the cache activeness ratio.

In an embodiment of the system, the total number of cache entries includes additional cache entries of one or more additional caches of a same type, and the other cache entries of the cache include additional cache entries of the one or more additional caches of the same type.

In an embodiment of the system, the processing system is further configured to determine that another cache entry of the cache has been deleted, identify another data object that corresponds to the other cache entry, that includes another time stamp for another previous access of the other cache entry associated with another counter index having another index value that corresponds to another counter associated with another time window in which another value of the other counter was incremented based on the other previous access to the other cache entry, and decrement the other value of the other counter based on the identify the other data object, where to generate the command to configure the cache is also based at least on the other value of the other counter.

A computer-readable storage medium having program instructions recorded thereon that, when executed by a processing system, performs a method, is also described. The methods are for determining internal cache activeness and for cache reclamation, as described herein. The method includes detecting an access to a cache entry of a cache at an access time by monitoring the cache, identifying a data object, responsive to the detecting, that corresponds to the cache entry, and that includes a time stamp for a previous access of the cache entry, and performing a conditional counter operation that includes incrementing a value of a current counter, of a time window that includes the access time, based at least on the time stamp being outside of the time window or maintaining the value of the current counter based at least on the time stamp being within the time window. The method also includes generating a command to configure the cache based at least on the value of the current counter.

In an embodiment of the computer-readable storage medium, the time stamp is a logical time stamp associated with an index value that corresponds to another counter associated with a previous time window in which another value of the other counter was incremented based on the previous access to the cache entry, and the method further includes, prior to performing the conditional counter operation, identifying the other counter based on the data object, and decrementing the other value of the other counter, where generating the command to configure the cache is also based at least on the other value of the other counter.

In an embodiment of the computer-readable storage medium, the method includes, prior to detecting the access, generating the data object to include the logical time stamp responsive to the previous access to the cache entry during the previous time window, and subsequent to the performing the conditional counter operation, updating the logical time stamp of the data object to correspond to the detection time and to identify the current counter of the time window.

In an embodiment of the computer-readable storage medium, the current counter and the other counter include a plurality of counters having respective consecutive time windows, of which the time window is most recent, that span a time period, and the method further includes, prior to said detecting the access, incrementing at least one of the plurality of counters based on detecting one or more respective accesses associated with other cache entries of the cache during the respective consecutive time windows, and determining a cache activeness ratio over a portion of the time period based on a total number of cache entries of the cache and the values of the plurality of counters, where generating the command to configure the cache is based on values of the plurality of counters, and wherein the command is configured to cause reclamation of a portion of the cache or to cause allocation of an additional portion to the cache based on the cache activeness ratio.

V. CONCLUSION

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system, the method comprising:
   detecting an access to a cache entry of a cache at an access time by monitoring the cache;
   identifying a data object, responsive to said detecting that corresponds to the cache entry and that includes a time stamp for a previous access of the cache entry;
   performing a conditional counter operation that includes:
      incrementing a value of a current counter, of a time window that includes the access time, based at least on the time stamp being outside of the time window; or
      maintaining the value of the current counter based at least on the time stamp being within the time window; and
   generating a command to configure the cache based at least on the value of the current counter.

2. The method of claim 1, wherein the time stamp is a logical time stamp associated with an index value that corresponds to another counter associated with a previous time window in which another value of the other counter was incremented based on the previous access to the cache entry;
   the method further comprising, prior to said performing the conditional counter operation:
      identifying the other counter based on the data object; and
      decrementing the other value of the other counter;
   wherein said generating the command to configure the cache is also based at least on the other value of the other counter.

3. The method of claim 2, further comprising:
   prior to said detecting the access, generating the data object to include the logical time stamp responsive to the previous access to the cache entry during the previous time window; and
   subsequent to said performing the conditional counter operation:
      updating the logical time stamp of the data object to correspond to the detection time and to identify the current counter of the time window.

4. The method of claim 1, further comprising:
   determining, based on a timer, that a current time is outside of the time window;
   instantiating another counter having another time window that begins at the current time;
   detecting another access to the cache entry or another cache entry of the cache at another access time within the other time window by monitoring the cache; and
   incrementing another value of the other counter based on said detecting the other access;
   wherein said generating the command to configure the cache is also based at least on the other value of the other counter.

5. The method of claim 1, wherein the current counter and the other counter comprise a plurality of counters having respective consecutive time windows, of which the time window is most recent, that span a time period;
   the method further comprising, prior to said detecting the access:

incrementing at least one of the plurality of counters based on detecting one or more respective accesses associated with other cache entries of the cache during the respective consecutive time windows;
wherein said generating the command to configure the cache is based on values of the plurality of counters.

6. The method of claim 5, further comprising:
determining a cache activeness ratio over a portion of the time period based on a total number of cache entries of the cache and the values of the plurality of counters;
wherein the command is configured to cause reclamation of a portion of the cache or to cause allocation of an additional portion to the cache based on the cache activeness ratio.

7. The method of claim 6, wherein the total number of cache entries comprises additional cache entries of one or more additional caches of a same type; and
wherein the other cache entries of the cache comprise additional cache entries of the one or more additional caches of the same type.

8. The method of claim 1, further comprising:
determining that another cache entry of the cache has been deleted;
identifying another data object that corresponds to the other cache entry, that includes another time stamp for, another previous access of the other cache entry, associated with another counter index having another index value that corresponds to another counter associated with another time window in which another value of the other counter was incremented based on the other previous access to the other cache entry; and
decrementing the other value of the other counter based on said identifying the other data object;
wherein said generating the command to configure the cache is also based at least on the other value of the other counter.

9. A system that comprises:
a processing system comprising one or more processors; and
a memory configured to store program instructions that, when executed, configure the processing system to:
detect an access to a cache entry of a cache at an access time by monitoring the cache;
identify a data object, responsive to said detecting, that corresponds to the cache entry, and that includes a time stamp for a previous access of the cache entry;
perform a conditional counter operation that includes to:
increment a value of a current counter, of a time window that includes the access time, based at least on the time stamp being outside of the time window; or
maintain the value of the current counter based at least on the time stamp being within the time window; and
generate a command to configure the cache based at least on the value of the current counter.

10. The system of claim 9, wherein the time stamp is a logical time stamp associated with an index value that corresponds to another counter associated with a previous time window in which another value of the other counter was incremented based on the previous access to the cache entry; and
wherein the processing system, prior to said performing the conditional counter operation, is further configured to:
identify the other counter based on the data object; and
decrement the other value of the other counter;
wherein said generate the command to configure the cache is also based at least on the other value of the other counter.

11. The system of claim 10, wherein the processing system is further configured to:
prior to said detect the access, generate the data object to include the logical time stamp responsive to the previous access to the cache entry during the previous time window; and
subsequent to said perform the conditional counter operation:
update the logical time stamp of the data object to be the detection time and to identify the current counter of the time window.

12. The system of claim 9, wherein the processing system is further configured to:
determine, based on a timer, that a current time is outside of the time window;
instantiate another counter having another time window that begins at the current time;
detect another access to the cache entry or another cache entry of the cache at another access time within the other time window by monitoring the cache; and
increment another value of the other counter based on said detecting the other access;
wherein said generate the command to configure the cache is also based at least on the other value of the other counter.

13. The system of claim 9, wherein the current counter and the other counter comprise a plurality of counters having respective consecutive time windows, of which the time window is most recent, that span a time period;
wherein the processing system, prior to said detecting the access, is further configured to:
increment at least one of the plurality of counters based on detecting one or more respective accesses associated with other cache entries of the cache during the respective consecutive time windows; and
wherein said generate the command to configure the cache is based on values of the plurality of counters.

14. The system of claim 13, wherein the processing system is further configured to:
determine a cache activeness ratio over a portion of the time period based on a total number of cache entries of the cache and the values of the plurality of counters;
wherein the command is configured to cause reclamation of a portion of the cache or to cause allocation of an additional portion to the cache based on the cache activeness ratio.

15. The system of claim 14, wherein the total number of cache entries comprises additional cache entries of one or more additional caches of a same type; and
wherein the other cache entries of the cache comprise additional cache entries of the one or more additional caches of the same type.

16. The system of claim 9, wherein the processing system is further configured to:
determine that another cache entry of the cache has been deleted;
identify another data object that corresponds to the other cache entry, that includes another time stamp for another previous access of the other cache entry associated with another counter index having another index value that corresponds to another counter associated with another time window in which another value of the other counter was incremented based on the other previous access to the other cache entry; and decrement the other value of the other counter based on said identify the other data object;

wherein said generate the command to configure the cache is also based at least on the other value of the other counter.

17. A computer-readable storage medium having program instructions recorded thereon that, when executed by a processing system, perform a method comprising:

detecting an access to a cache entry of a cache at an access time by monitoring the cache;

identifying a data object, responsive to said detecting, that corresponds to the cache entry, and that includes a time stamp for a previous access of the cache entry;

performing a conditional counter operation that includes:
incrementing a value of a current counter, of a time window that includes the access time, based at least on the time stamp being outside of the time window; or maintaining the value of the current counter based at least on the time stamp being within the time window; and generating a command to configure the cache based at least on the value of the current counter.

18. The computer-readable storage medium of claim 17, wherein the time stamp is a logical time stamp associated with an index value that corresponds to another counter associated with a previous time window in which another value of the other counter was incremented based on the previous access to the cache entry; and wherein the method further comprises, prior to said performing the conditional counter operation:
identifying the other counter based on the data object; and
decrementing the other value of the other counter;

wherein said generating the command to configure the cache is also based at least on the other value of the other counter.

19. The computer-readable storage medium of claim 18, wherein the method includes:

prior to said detecting the access, generating the data object to include the logical time stamp responsive to the previous access to the cache entry during the previous time window; and subsequent to said performing the conditional counter operation:
updating the logical time stamp of the data object to correspond to the detection time and to identify the current counter of the time window.

20. The computer-readable storage medium of claim 17, wherein the current counter and the other counter comprise a plurality of counters having respective consecutive time windows, of which the time window is most recent, that span a time period;

wherein the method further comprises:
prior to said detecting the access, incrementing at least one of the plurality of counters based on detecting one or more respective accesses associated with other cache entries of the cache during the respective consecutive time windows; and determining a cache activeness ratio over a portion of the time period based on a total number of cache entries of the cache and the values of the plurality of counters; and wherein said generating the command to configure the cache is based on values of the plurality of counters, and wherein the command is configured to cause reclamation of a portion of the cache or to cause allocation of an additional portion to the cache based on the cache activeness ratio.

* * * * *